H. E. HOOKER.
Tank for Hot Houses.
No. 42,374.
Patented April 19, 1864.
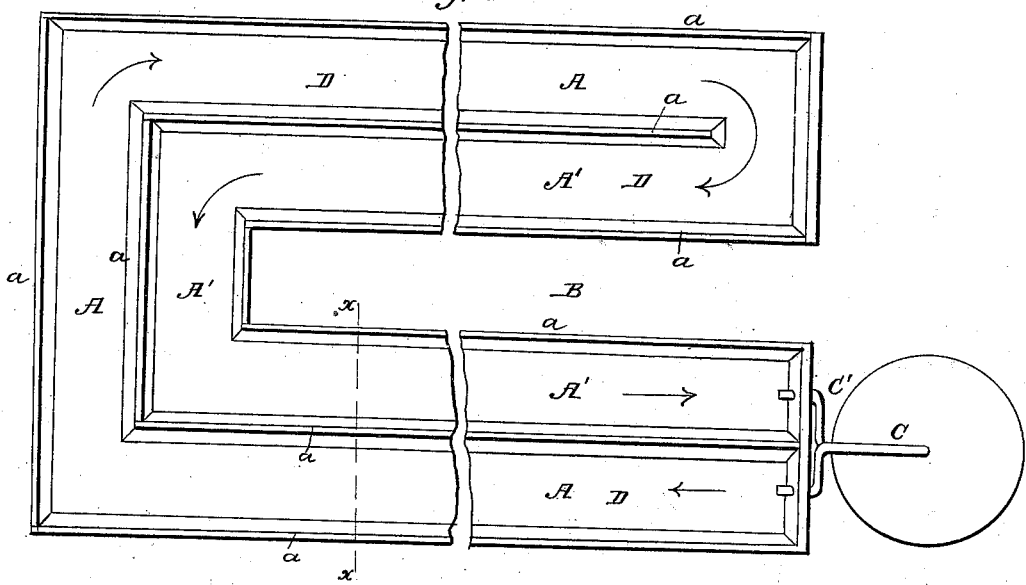
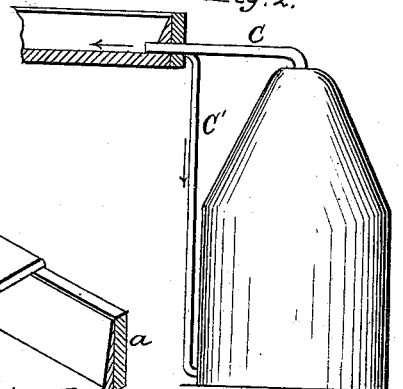
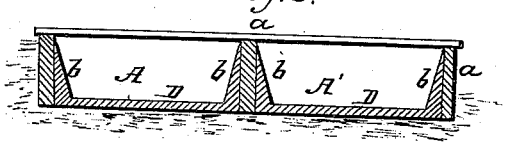
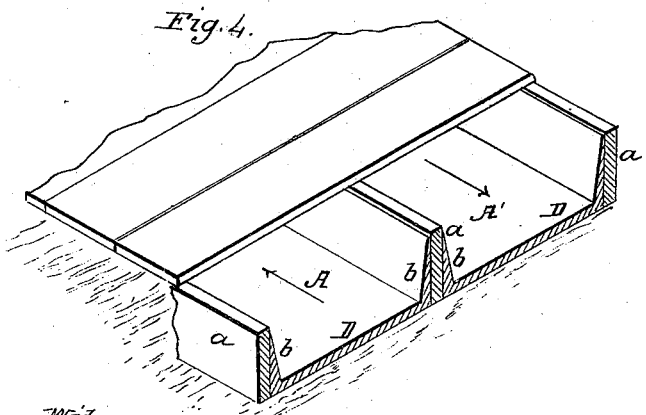
Witnesses:
Jay Hyatt
Archibald Friars
Inventor:
H. E. Hooker
By J. Fraser & Co.
Attys.

UNITED STATES PATENT OFFICE.

HENRY E. HOOKER, OF ROCHESTER, NEW YORK.

IMPROVEMENT IN TANKS FOR HOT-HOUSES.

Specification forming part of Letters Patent No. 42,374, dated April 19, 1864.

*To all whom it may concern:*

Be it known that I, H. E. HOOKER, of Rochester, in the county of Monroe and State of New York, have invented a new and useful Improvement in the Troughs or Tanks Used for Warming Hot-Houses; and I do hereby declare that the following is a full and exact description thereof, reference being had to the accompanying drawings, making part of this specification.

Figure 1 is a plan of my improved arrangement; Fig. 2, an elevation showing the manner of connecting the pipes to produce a circuit of the water; Fig. 3, a cross-section of the troughs or tanks in the plane of the line *x x*, Fig. 1; Fig. 4, a similar section in the same plane, but showing the troughs or tanks in perspective.

Like letters of reference indicate corresponding parts in all the figures.

In ordinary hot-houses the troughs or tanks through which the warm water is circulated for the purpose of modifying the temperature are made of wood. There are several objections to this: First, it is very expensive—the troughs or tanks in an ordinary-sized hot-house costing several hundred dollars; second, the wood, by being in contact with the water, soon decays, and thus necessitates frequent renewal; third, in warm weather the wood-work shrinks if the water is turned off, so as to become incapable of holding water; and, fourth, the use of wood insulates, as it were, the plants from the benefit of the temperature and humidity of the earth beneath.

It is the object of my improvement to remedy these difficulties; and my invention consists in forming the troughs or tanks of water-lime or other water-proof cement laid upon the earth, with the sides and partitions thereof consisting of strips of board, plank, or equivalent, set up vertically, and not necessarily connected with any frame-work or other supporting parts.

In general outline and form my troughs or tanks do not differ from those ordinarily used for the same purpose.

Fig. 1 represents the troughs or tanks A A' as passing around both sides and one end of the hot-house, with the usual central passage, B, between. The water from the boiler passes from the induction-pipe C into the trough A, following the direction of the arrows, and returns through the trough A' to the exit-pipe C', and into the bottom of the boiler. Thus far the arrangement does not differ essentially from others already in use. If desired, the troughs may be differently arranged to produce a different flow.

In forming the troughs or tanks A A', I first level the earth to contain them. I then form the boundaries of the troughs and the partition that separates them (when used) of strips *a a a*, of board or plank set up edgewise, or of bricks or other material that will accomplish the same effect. These strips or equivalent are entirely disconnected from each other or any sustaining frame-work, so that they are self-supporting, with the addition of the earth filled up and resting outside against them, and with the addition of the hydraulic cement on the inside. I prefer to make this cement D of water-lime, as it is the cheapest material that I know of for the purpose; but, if desired, it may consist of any water-proof material that will accomplish the same effect—viz., retain the water without leakage under all circumstances. I spread this cement over the bottom of the troughs, preferably on the bare earth, E; but, if desired, on a floor of bricks or tiles, &c., and also up the sides of the strips *a a a*, as shown at *b b*, Figs. 3 and 4.

The tanks are covered by a suitable boarding or equivalent, on which the plants are placed.

The following are among the advantages of this arrangement:

First. The troughs or tanks thus formed are almost indestructible, lasting for years, and growing better by constant usage, while the ordinary wooden tanks are continually decaying and needing repairs, and become shrunken and almost worthless in warm weather when the water is withdrawn.

Second. The construction is very cheap, costing not one-sixth that of the wooden tanks, and the employment of skillful mechanics is not required. But very little material is required, and that of the simplest nature and easily procured, the sides and partitions being simple strips or equivalents and the cement being laid upon the earth. This simple construction is so strong, being filled around with and resting on the solid earth, that there is no danger of its becoming injured, and, therefore, the cost of keeping it in repair is very small.

Third. What little wood is employed in the construction is almost entirely insulated not only from the water, but also from the air, by the cement, the top edges of the strips *a a* only being exposed; and if the wood should decay it would not impair the usefulness of the trough or tank, for it would become so hardened that it would retain its form even after the wood had disappeared.

Fourth. Being thus sunk beneath the surface of the ground, instead of resting above it, as in the ordinary arrangements, not only are the strips *a a* suitably supported without any frame-work, but the whole trough retains that humidity and equability of temperature so essential to the growing plants. This effect is produced still further by the peculiar construction of the bottom of the trough, forming a thin layer in contact with the ground.

I do not claim, broadly, an arrangement of troughs or tanks in hot-houses for producing a circuit of heated water; nor do I claim the application of water lime or cement to various purposes for holding or conducting water, as I am aware that the same have long been known; but

What I claim as my invention, and desire to secure by Letters Patent, is—

The particular construction and arrangement of the troughs or tanks A A', the same consisting of the simple self-supporting and insulated sides and partition *a a a*, and the bottom D of hydraulic mortar, arranged relatively with the earth E and sides and partition *a a a*, substantially as and for the purposes herein set forth.

In witness whereof I have hereunto signed my name in the presence of two subscribing witnesses.

H. E. HOOKER.

Witnesses:
R. F. OSGOOD,
JAY HYATT.